United States Patent
Sugiyama

(10) Patent No.: US 7,048,393 B2
(45) Date of Patent: May 23, 2006

(54) DOOR MIRROR ASSEMBLY FOR A VEHICLE

(75) Inventor: Kazuhiro Sugiyama, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 61 days.

(21) Appl. No.: 10/680,137

(22) Filed: Oct. 8, 2003

(65) Prior Publication Data

US 2004/0080840 A1    Apr. 29, 2004

(30) Foreign Application Priority Data

Oct. 25, 2002 (JP) .............................. 2002-310622

(51) Int. Cl.
G02B 7/182 (2006.01)
B60R 1/06 (2006.01)

(52) U.S. Cl. ...................... 359/871; 359/841; 359/872; 359/877; 248/475.1; 248/477

(58) Field of Classification Search ................ 359/841, 359/871, 872, 877; 248/475.1, 476, 477, 248/488
See application file for complete search history.

(56) References Cited

U.S. PATENT DOCUMENTS

| | | | | |
|---|---|---|---|---|
| 3,005,385 A | * | 10/1961 | Meade et al. | 359/877 |
| 4,988,179 A | * | 1/1991 | Stensland | 359/877 |
| 5,227,924 A | * | 7/1993 | Kerper | 359/875 |
| 5,245,480 A | * | 9/1993 | Polzer | 359/841 |
| 5,331,471 A | * | 7/1994 | Gilbert | 359/874 |
| 5,781,353 A | * | 7/1998 | Seubert et al. | 359/841 |
| 6,347,872 B1 | * | 2/2002 | Brechbill et al. | 359/879 |
| 6,382,805 B1 | * | 5/2002 | Miyabukuro | 359/872 |
| 6,447,129 B1 | * | 9/2002 | Hayashi et al. | 359/879 |
| 6,550,923 B1 | * | 4/2003 | Sakamoto et al. | 359/841 |
| 6,616,286 B1 | * | 9/2003 | Hayashi et al. | 359/841 |
| 6,712,329 B1 | * | 3/2004 | Ishigami et al. | 248/475.1 |
| 6,811,270 B1 | * | 11/2004 | Yoshida | 359/841 |

FOREIGN PATENT DOCUMENTS

| | | |
|---|---|---|
| EP | 0 276 677 | 8/1988 |
| EP | 0 433 584 | 6/1991 |
| EP | 1 116 628 | 7/2001 |
| JP | 07-223489 | 8/1995 |
| JP | 08-244532 | 9/1996 |
| JP | 10-100794 | 4/1998 |
| JP | 2001-294087 | 10/2001 |

\* cited by examiner

*Primary Examiner*—Ricky D. Shafer
(74) *Attorney, Agent, or Firm*—Oblon, Spivak, McClelland, Maier & Neustadt, P.C.

(57) ABSTRACT

A door mirror assembly for a vehicle is provided, which includes a housing, a frame supporting the housing internally. The housing has a shell with a front aperture, two fixation ports and an engagement port. On the other hand, the frame has a main body to be enclosed by the shell, two fixation elements and an engagement element. The door mirror assembly further includes two fixation sections formed by fixing the two fixation ports and two fixation elements with fasteners and an engagement section formed by engaging the engagement port and engagement element. The door mirror assembly has a feature that the engagement section is adapted to be on the circumference of a circle, the center of circle lies on an axis defined by the two fixation sections, so that the rotational displacement of housing relative to the frame can be restricted.

5 Claims, 6 Drawing Sheets

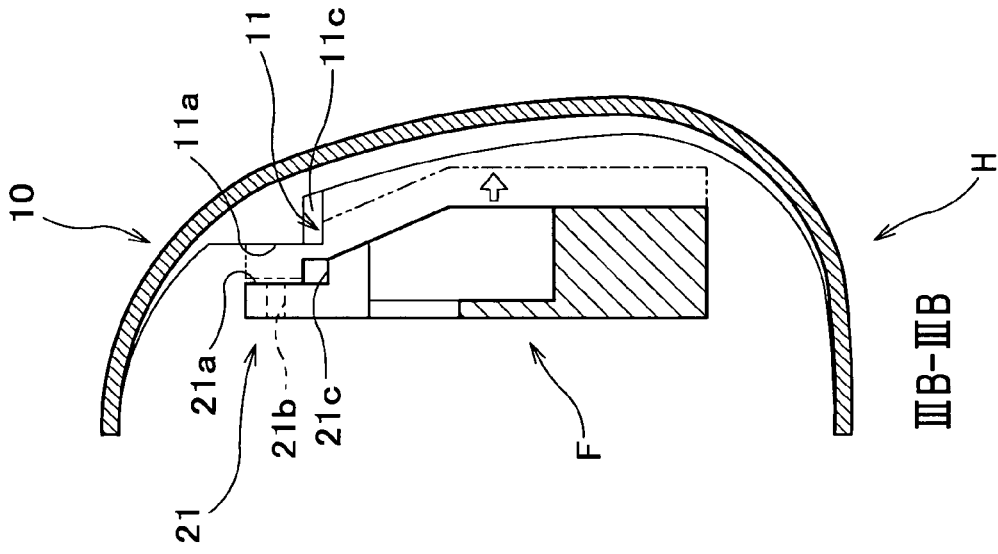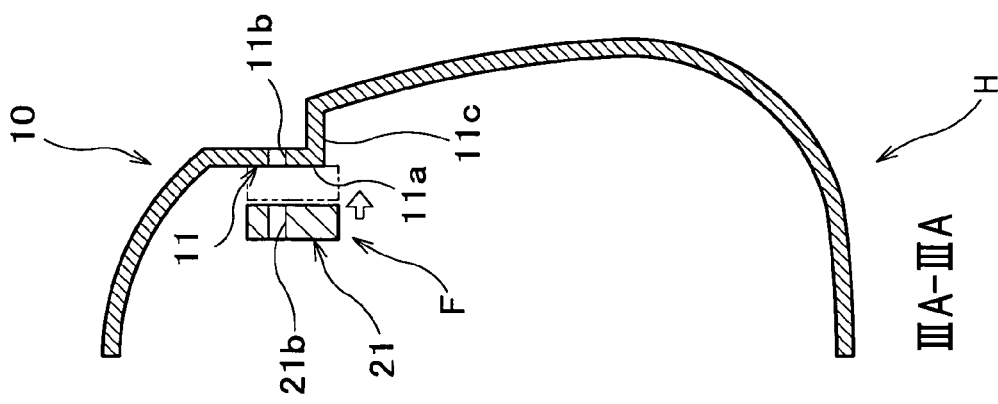

DOOR MIRROR ASSEMBLY FOR A VEHICLE

FIELD OF THE INVENTION

The present invention relates to a door mirror assembly for a vehicle characterized by the structure of fixation between a door mirror housing and a frame.

BACKGROUND OF THE INVENTION

A door mirror assembly for a vehicle has been conventionally constructed of various elements and sub-assemblies, including a mirror, a control sub-assembly for controlling the angle of mirror and a drive sub-assembly for positioning the door mirror assembly in a retracted or an operative position, which are installed in a shell called door mirror housing. Since a door mirror housing, which is made of a synthetic resin, is susceptible to mechanical deformation such as torsion, it has been common to incorporate an element such as a frame into the door mirror housing. In this case, the door mirror housing and frame are commonly fixed with fasteners such as screws at three locations or more. Japanese Patent No. 3301571 (Japanese Published Patent application 07-223489) and Japanese Published Patent Application 10-100794 disclose the related techniques.

In this connection, other two documents report techniques, which do not employ screws for fixing a door mirror housing and a frame. Japanese Published Patent Application 2001-294087 discloses clips made of a synthetic resin or Japanese Published Patent Application 08-244532 discloses the application of ultrasonic welding.

It is understood that a reduction in the number of parts and man-hour expenditure will contribute to a reduction in the production cost of a door mirror assembly for a vehicle. It is therefore important to improve working efficiency as a result of a reduction in the number of fasteners such as screws in fixing a door mirror housing and a frame. However, if the number of fasteners such as screws and clips is decreased carelessly for a conventional door mirror assembly, the resultant fixation strength will be inadequate. It leads to posing a problem that chattering of a mirror during vehicular travel adversely affects the visibility of a driver or noise spoils the comfortableness in a cabin.

SUMMARY OF THE INVENTION

The object of the present invention is to provide a door mirror assembly for a vehicle, which can not only achieve a reduction in the number of parts for fixing a door mirror housing and a frame but also insure adequate fixation strength therebetween as well as easy assembling and low cost.

An aspect of the present invention is to provide a door mirror assembly for a vehicle, which includes a housing, a frame supporting the housing internally. The housing has a feature that it has a shell with a front aperture, two fixation ports formed on the inner surface of shell and an engagement port formed integrally with the shell. On the other hand, the frame has a feature that it has a main body to be enclosed by the shell, two fixation elements formed on the outer surface of main body and an engagement element formed integrally with the main body.

The door mirror assembly further includes two fixation sections formed by fixing the two fixation ports and two fixation elements with fasteners and an engagement section formed by engaging the engagement port and engagement element. The door mirror assembly has a feature that the engagement section is adapted to be on the circumference of a circle, the center of circle lies on an axis defined by the two fixation sections, so that the rotational displacement of housing relative to the frame can be restricted.

The door mirror assembly described above employs fixation between the housing and frame with the two fixation sections and engagement section, which is on the circumference of circle characterized spatially by the above description. Since the engagement section is positioned optimally, it is possible to reduce the number of fixation sections to two, which requires fasteners. The engagement section is formed simply by engaging the engagement port, which is formed integrally with the shell of housing, and the engagement element, which is formed integrally with the main body of frame. Therefore, the door mirror assembly can allow both easy assembly and a reduction in the number of parts as well as man-hours associated with assembly. In this connection, though the fixation strength of engagement section is lower than that of fixation section, it is possible to acquire adequate fixation strength for fixing the housing and frame with the two fixation sections as a result of optimum positioning of the engagement section. Description is given for explaining the mechanism of this more specifically. When a housing and a frame are fixed at only two locations, a housing, which is not a rigid body, generally experiences displacement relative to the frame about an axis defined by two fixation sections. Addition of an engagement section adapted to be on the circumference of a circle, the center of which lies on the axis, restricts the rotational displacement (torsional displacement about the axis), thereby reinforcing the fixation strength. It is noted that the addition of engagement section does not result in an increase in the product cost since an engagement port and an engagement element are formed integrally with molding of a housing and a frame, respectively.

Another aspect of the present invention is to provide a door mirror assembly, which has a feature that at least two engagement sections are provided and the engagement sections restrict the rotational displacement of housing in opposite directions each other.

Since the door mirror assembly described above employs two fixation sections and two engagement sections or more for fixing a housing and a frame, the engagement sections restrict the rotational displacement of housing in opposite directions each other so that the housing can not be unsteady relative to the frame. Addition of a fixation section, which requires an increase in the number of parts, will be followed by an increase in the product cost. On the other hand, it will not increase the product cost if the number of engagement section is increased. The reason for this is that an engagement port and an engagement element are formed integrally with molding of a housing and a frame, respectively.

Still another aspect of the present invention is to provide a door mirror assembly, in which an engagement port includes a hole drilled into a shell, and an engagement element includes a column projecting from a main body and the column has a claw at an end thereof. The door mirror assembly has a feature that not only the column is adapted to reach beyond the outer surface of shell through the hole while the column is in contact with a side wall of the hole, but also the claw is adapted to be in contact with the periphery of hole.

The door mirror assembly described above, which has simple structure for engagement that the column formed on frame is engaged with the hole drilled into the shell, enables a reduction in the production cost.

Yet another aspect of the present invention is to provide a door mirror assembly, which has a feature that a column has a contact surface to be in contact with the inner surface of a shell.

The door mirror assembly described above, in which the shell of a housing is interposed between a claw and the contact surface, can provide higher fixation strength.

A further aspect of the present invention is to provide a door mirror assembly, which has a feature that a claw is adapted to be positioned so that a direction of the width of claw is substantially in parallel with an axis defined by two fixation sections.

The door mirror assembly described above can apply the force to engagement sections evenly, which restricts the rotational displacement and deformation of a housing in a circumferential direction.

BRIEF DESCRIPTION OF THE DRAWINGS

FIG. 3A is a sectional view taken along line IIIA—IIIA in FIG. 2A.

FIG. 3B is a sectional view taken along line IIIB—IIIB in FIG. 2A.

DESCRIPTION OF THE PREFERRED EMBODIMENTS

An embodiment of the present invention is now described referring to the accompanying drawings.

Figure 1:
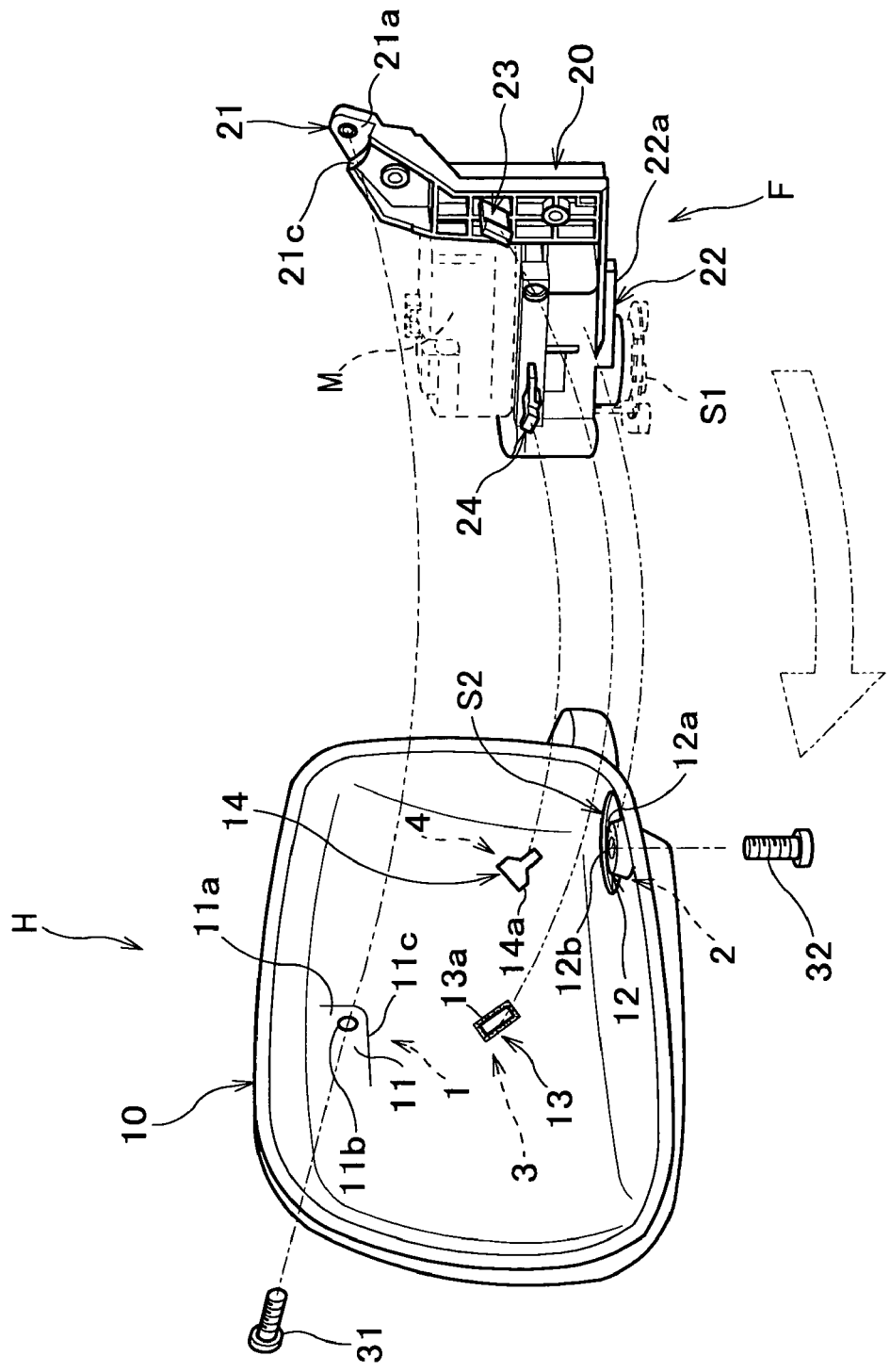
FIG. 1 is an exploded perspective view showing a door mirror assembly for a vehicle according to the present invention.
Figure 2A:
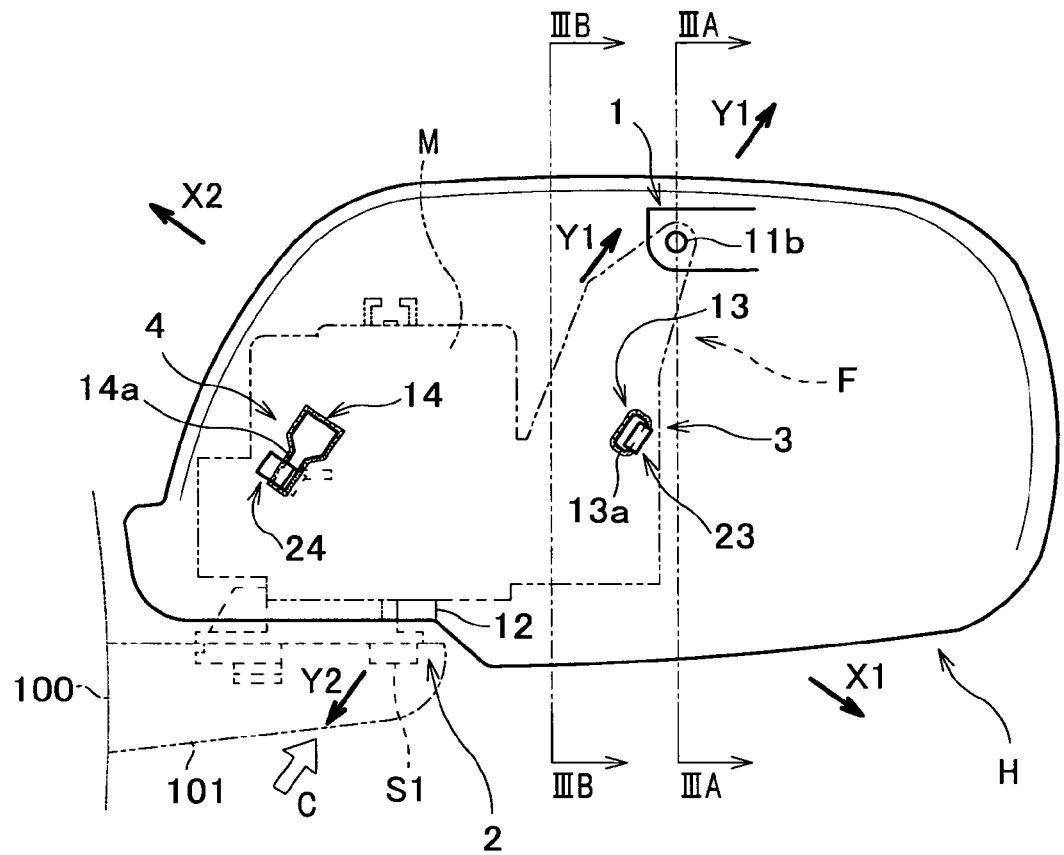
FIG. 2A is a view showing a door mirror assembly as viewed from the rear.
Figure 2B:
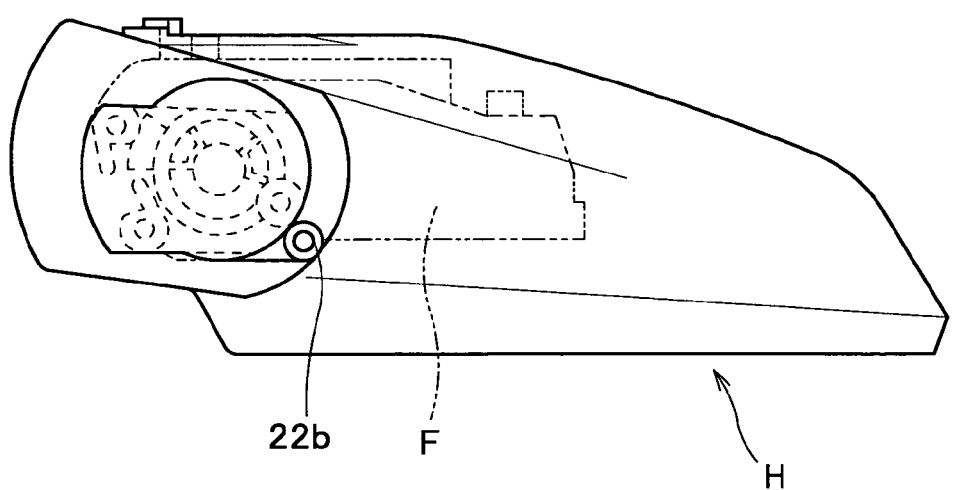
FIG. 2B is a view showing a door mirror assembly as viewed from the bottom.

As shown in FIGS. 1, 2A and 2B, a door mirror assembly for a vehicle according to the present invention includes a door mirror housing (hereinafter referred to as a housing H) and a frame F which supports the housing H internally. The door mirror assembly is mounted on a mirror base 101 which is provided on the side of a vehicle 100, as shown in FIG. 2A. The door mirror assembly also includes a mirror (not shown) which is installed in the front aperture of housing H, and accommodates a control sub-assembly (not shown) for controlling the angle of mirror within the housing H.

As shown FIG. 1, the housing H includes a shell 10 made of a synthetic resin, upper and lower fixation ports 11 and 12 which are formed on the inner surface of shell 10 and first and second engagement ports 13 and 14 which are formed integrally with the shell 10. The positions of the upper and lower fixation ports 11, 12 and the first and second engagement ports 13, 14 are correlated with those of upper and lower fixation elements 21, 22 and first and second engagement elements 23, 24, respectively.

As shown in FIG. 1, the upper fixation port 11 has a bearing surface 11a, which is formed on the upper middle of inner surface of shell 10 and a screw hole 11b drilled into the bearing surface 11a. As shown in FIG. 3A depicting a cross sectional view taken along line IIIA—IIIA in FIG. 2A, an L-shaped portion recessed inward the shell 10 forms the upper fixation port 11. The lower portion of side surface 11c of upper fixation port 11 is configured to be circular, as shown in FIG. 1.

A lower fixation port 12, which is formed at the bottom of shell 10, has a bearing surface 12a and a screw hole 12b drilled into the center of bearing surface 12a.

As shown in FIGS. 1 and 2A, the first engagement port 13 has a hole 13a, which is rectangle and integrally formed with the shell 10. The position of first engagement port 13 is correlated with that of first engagement element 23, and the hole 13a is adapted to take the size that is appropriate for insertion of a claw 23b shown in FIG. 5.

As shown in FIGS. 1 and 2A, the second engagement port 14 has a hole 14a, which has a T-shaped section and formed integrally with the shell 10. The position of second engagement port 14 is correlated with that of second engagement element 24, and the hole 14a is arranged so that the upper width is larger than that of the lower width. The upper width of hole 14a is adapted to take the size that is appropriate for insertion of a claw 24b shown in FIG. 5. On the other hand, the lower width is adapted to be same as the thickness of thinner portion of a column 24a shown in FIG. 5.

As shown in FIG. 4, the frame F includes a main body 20, which is made of a synthetic resin and nearly L-shaped as viewed from the side thereof, and the upper and lower fixation elements 21, 22 formed on the outer surface of main body 20 and the first and second engagement elements 23, 24 formed integrally with the main body 20. Also on the main body 20 is mounted a drive assembly M for positioning a door mirror assembly in a retracted or operative position. In this connection, a symbol S1 represents a base of shaft for transmitting drive power generated by the drive assembly M.

Figure 4A:
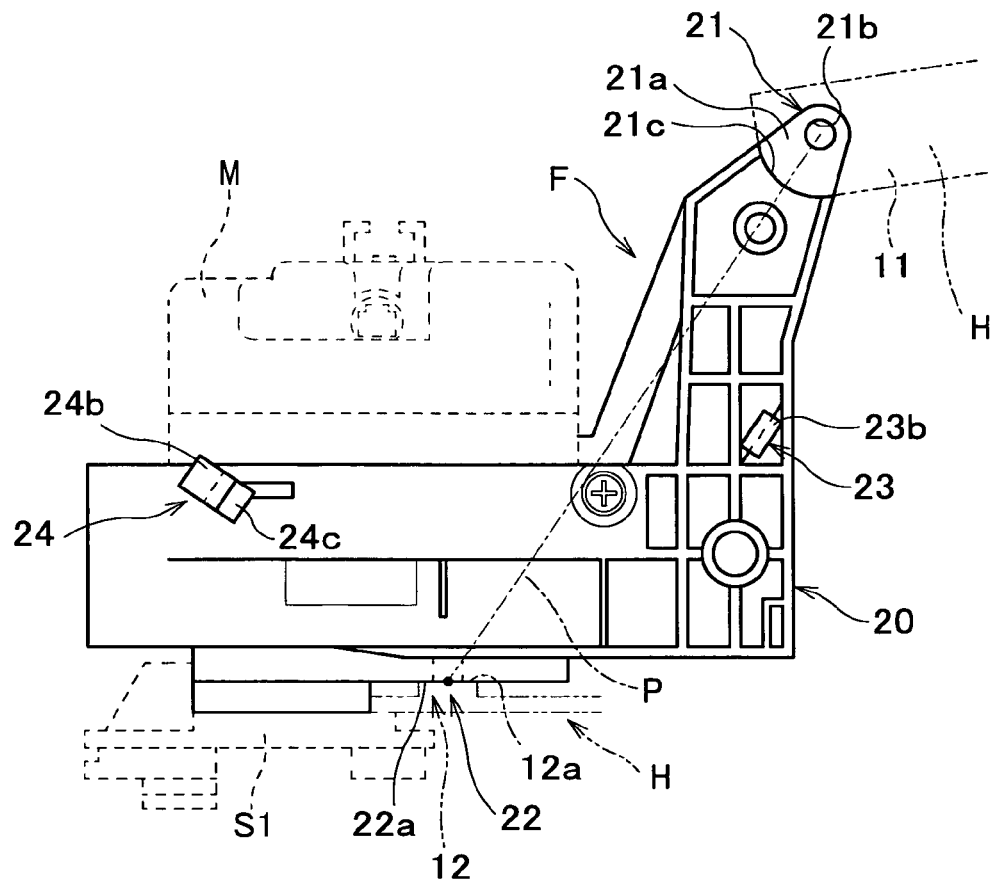
FIG. 4A is a view showing a frame as viewed from the rear.

As shown in FIG. 4A, the upper fixation element 21, which is formed on the upper end of main body 20, has a mounting surface 21a which comes in contact with the bearing surface 11a of housing H shown in FIG. 1 and a screw hole 21b drilled into the mounting surface 21a. In the present embodiment, an upper fixation element 21 is located at a thinned portion of the upper end of main body 20. A contact surface 21c of upper fixation element 21 is adapted to be circular, which is substantially perpendicular to an axis P defined by the screw holes 21b and 22b, and comes into contact with the side surface 11c of upper fixation port 11 shown in FIG. 1.

Figure 4B:
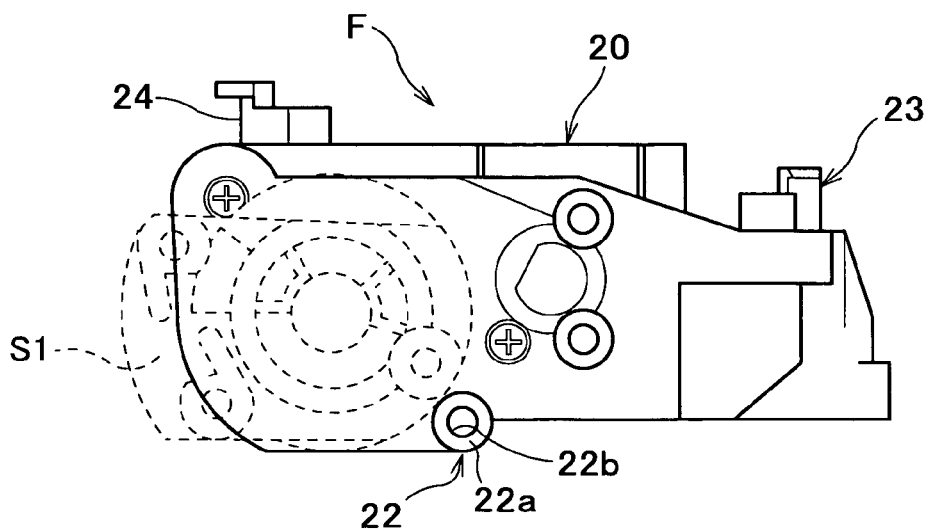
FIG. 4B is a view showing a frame as viewed from the bottom.

As shown in FIGS. 4A and 4B, the lower fixation element 22, which is formed at the bottom of main body 20, has a mounting surface 22a to be in contact with the bearing surface 12a of housing H and a screw hole 22b drilled into the mounting surface 22a.

Figure 5:
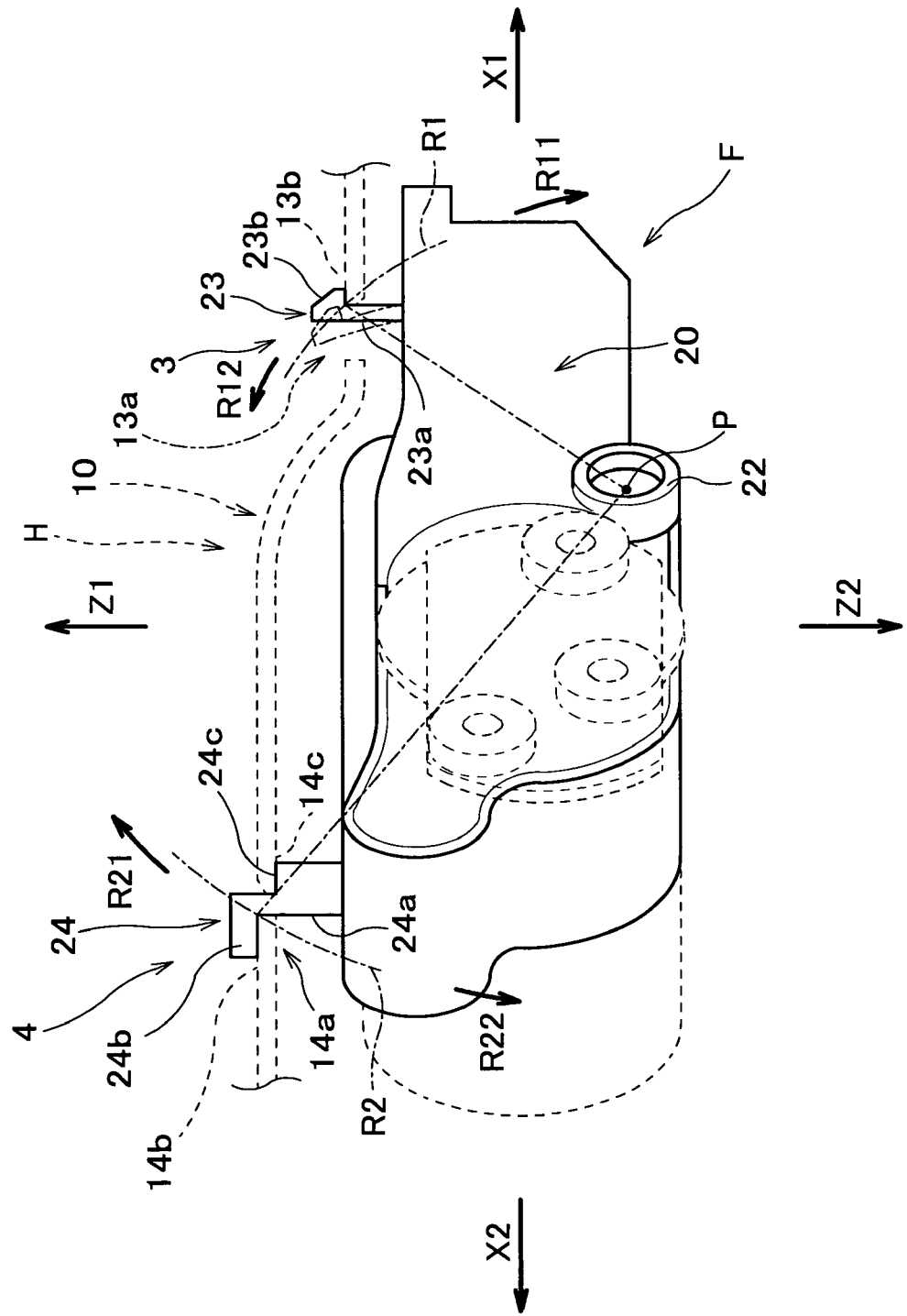
FIG. 5 is a view showing a mirror assembly as viewed in the direction identified with an arrow C in FIG. 2A.

As shown in FIG. 5, the first engagement element 23 includes a column 23a, which is like a plate and formed on the outer surface of main body 20 facing the shell 10.

The column 23a reaches beyond the outside surface of shell 10 through the hole 13a while it is in contact with the side wall of hole 13a. The column 23a has a claw 23b at the end thereof.

A surface of the claw 23b facing the main body 20 comes in contact with a periphery 13b of hole 13a flush with the outer surface of shell 10. As shown in FIG. 4A, the claw 23b is positioned so that the direction of width thereof is substantially parallel with the axis P defined by the screw holes 21b and 22b.

As shown in FIG. 5, the second engagement element 24 has a column 24a like a brick, which is formed on the outer surface of main body 20 facing the shell 10.

The column 24a reaches beyond the outer surface of shell 10 through the hole 14a while it is in contact with the side wall of hole 14a. The column 24a also has a claw 24b at the end thereof and a contact surface 24c parallel to the claw 24b in the middle thereof. The distance between the inner (lower) surface of claw 24b and contact surface 24c is adapted to be equal to the thickness of shell 10 (see FIG. 5).

A surface of the claw 24b facing the main body 20 comes in contact with a periphery 14b of hole 14a flush with the outer surface of shell 10. The contact surface 24c comes in contact with a periphery 14c of hole 14a flush with the inner surface of shell 10. As shown in FIG. 4A, the claw 24b is positioned so that the direction of width thereof is substantially parallel with the axis P.

In the present embodiment, the upper and lower fixation elements 21, 22 and the first and second engagement elements 23, 24 are provided peripherally on the main body 20, as shown in FIG. 4. This type of arrangement, which enables positioning of the elements in an evenly dispersed manner over the main body 20, allows stable retention of the housing H.

Figure 6:
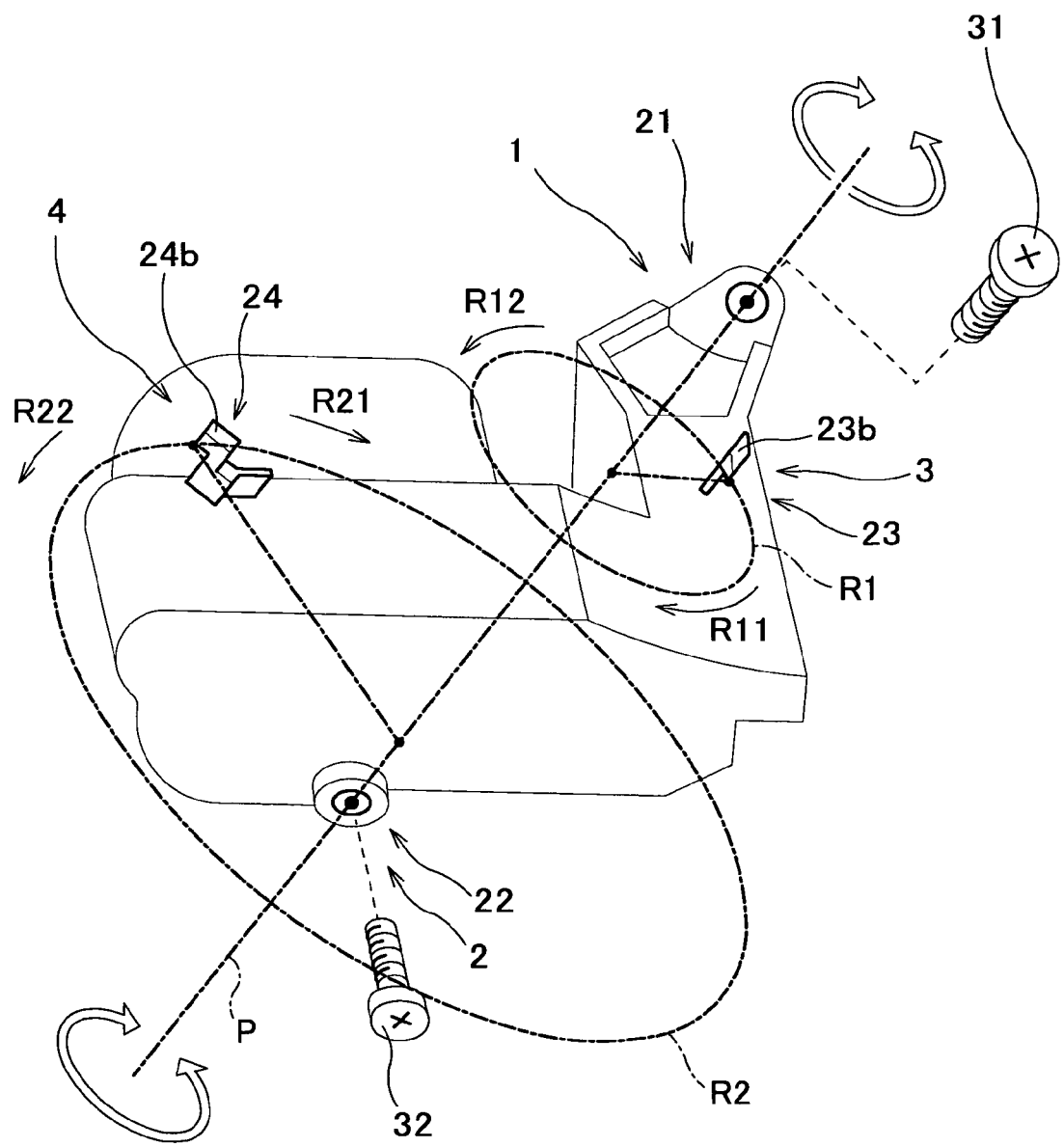
FIG. 6 is a conceptual schematic illustrating the positions of fixation section and engagement section.

As shown in FIG. 6, the claw 23b of column 23a and the claw 24b of column 24a are positioned on the circumferences of imaginary circles R1 and R2 respectively, the centers of which lie on the axis P defined by the upper and lower fixation elements 21 and 22.

A method for fixing a housing H and a frame F is described in detail.

As shown in FIG. 1, the frame F is mounted on a predetermined position inside the housing H. To be more specific, while a base S1 of shaft attached to the frame F is positioned above a shaft hole S2 drilled into the bottom of a shell 10, a second engagement element 24 of frame F is inserted into the portion of larger width of a hole 14a so that a claw 24b shown in FIG. 5 reaches the outside of shell 10.

Subsequently, the frame F is slid diagonally downward, in a Y2 direction shown in FIG. 2A, so that a column 24a is inserted into the smaller width portion of hole 14a until it rests on the bottom thereof. In this way, the column 24a and hole 14a are engaged completely. The engaged section is hereinafter referred to as a second engagement section 4. As shown in FIG. 5, at the second engagement section 4, the column 24a comes in contact with both side walls of the hole 14a and the inner side surface of claw 24b facing a main body 20 comes in contact with a periphery 14b of the hole 14a. Also a contact surface 24c comes in contact with the other periphery 14c of the hole 14a. In this way, the shell 10 of housing H is interposed between the claw 24b and contact surface 24c. Since the claw 24b of column 24a is positioned on the circumference of an imaginary circle R2, the center of which lies on an axis P defined by screw holes 21b and 22b shown in FIG. 4A, the second engagement section 4 is accordingly positioned on the same circumference.

As shown in FIGS. 2A and 5, the displacement and deformation of housing H in the directions shown by arrows X1, X2, Z1 and Z2 are restricted, so that the rotational displacement of housing H about the axis P relative to the frame F, in the directions identified with arrows R21 and R22, is restricted.

As shown FIG. 2A, the displacement and deformation of housing H relative to the frame F in the direction of arrow Y1 is restricted as the column 24a is inserted into the hole 14a until it rests on the bottom thereof.

As shown in FIG. 5, a hole 13a of housing H and a column 23a of frame F are aligned and the frame F is forced to move toward the housing H. The column 23a makes elastic deformation to enter the hole 13a. When the claw 23b reaches the outside of shell 10, the column 23a recovers from the deformation elastically and thereby the column 23a and hole 13a are engaged. The engaged section is hereinafter referred to a first engagement section 3. At the first engagement section 3, the column 23a comes in contact with a side wall of the hole 13a and the inner side surface of claw 23b facing the main body 20 comes in contact with the periphery 13b of hole 13a. Since the claw 23b of column 23a is positioned on the circumference of an imaginary circle R1, the center of which lies on the axis P defined by the screw holes 21b and 22b shown in FIG. 4A, the first engagement section 3 is accordingly positioned on the same circumference.

As shown in FIGS. 2A and 5, the displacement and deformation of housing H in the directions shown by arrows X2 and Z1 are restricted, so that the rotational displacement of housing H about the axis P relative to the frame F, in the direction identified with an arrow R12, is restricted.

It is possible to prevent the housing H from rattling relative to the frame F as a result of retention rendered by the first and second engagement sections 3 and 4. The first engagement section 3 restricts the rotational displacement of housing H relative to the frame F in the direction identified with the arrow R12 (R22). On the other hand, the second engagement section 4 restricts the rotational displacement in the reverse direction identified with the arrow R21 (R11).

As shown in FIGS. 3B and 4A, when the housing H and frame F are engaged, a contact surface 21c of upper fixation element 21 comes in contact with a side surface 11c of upper fixation port 11. Since the contact surface 21c is adapted to be substantially perpendicular to the axis P, the displacement and deformation of housing H relative to the frame F in the direction identified with an arrow Y2 are restricted. Also as described before, since the second engagement section 4 restricts the displacement and deformation in the direction of arrow Y1, as shown in FIG. 2A, it is consequently possible to restrict the displacement and deformation in the direction of axis P.

As shown in FIG. 1, when the housing H and frame F are engaged each other, a bearing surface 11a of upper fixation port 11 comes in contact with a mounting surface 21a of upper fixation element 21 and a screw hole 11b of upper fixation port 11 and a screw hole 21b of upper fixation element 21 are aligned. Similarly as shown in FIGS. 1 and 4B, a bearing surface 12a of lower fixation port 12 comes in contact with a mounting surface 22a of lower fixation element 22 and a screw hole 12b of lower fixation port 12 and a screw hole 22b of lower fixation element 22 are aligned.

As shown in FIG. 1, fasteners 31 such as screws are screwed into the screw hole 11b from the outside of housing H so that the upper fixation port 11 of housing H and upper fixation element 21 of frame F are fixed. This fixed section is hereinafter referred to as an upper fixation section 1. Similarly, fasteners 32 are screwed into the screw hole 12b from the outside of housing H so that the lower fixation port 12 and lower fixation element 22 are fixed. This fixed section is hereinafter referred to as a lower fixation section 2.

In the door mirror assembly for a vehicle according to the present embodiment, the housing H and frame F are fixed with the upper and lower fixation sections 1, 2 as shown in FIG. 2A, introducing the first and second engagement sections 3, 4, which are positioned on the circumferences of circles that have centers lying on the axis P. Fixation of the housing H and frame F at only two locations this way can allow a reduction in the number of parts and man-hour expenditure associated with assembling of a door mirror assembly.

Though the housing H and frame F are fixed at only two locations, adequate fixation strength can be obtained as a result of an appropriate positioning of the first and second engagement sections 3 and 4. Since the first and second engagement sections 3 and 4 are positioned on the circumferences of circles as shown in FIG. 6, the centers of which lie on the axis P defined by a line drawn between the upper and lower fixation sections 1 and 2, the rotational displacement (torsional displacement about the axis P) of housing H relative to the frame F is restricted, which as a result improves the fixation strength.

The housing H, which intrinsically tends to rotate around the axis P relative to the frame F, will not rattle under high fixation strength as a result of restriction provided by the first and second engagement sections 3 and 4. The first and second engagement sections 3 and 4, which are positioned offset from the axis P, can restrict rotational movements in the directions identified with the arrows R12 and R21, respectively.

It is possible to achieve excellent workability for steps of assembling the first and second engagement sections 3 and 4 since adhesives or fasteners such as screws are not required for the steps. The first engagement section 3 is assembled by inserting the column 23a integrally formed with main body 20 of frame F into the hole 13a integrally formed with shell 10 of housing H. The second engagement section 4 is assembled in the similar manner as that of the first engagement section 3.

At least during assembling a door mirror assembly, relatively secure fixation of the housing H and frame F, which is realized by simple engagement of these two, can prevent the frame F not only from slipping out of the housing H but also from experiencing displacement even if there is no mechanical fixation with fasteners. It will lead to excellent workability while the housing H and frame F are fixed with fasteners 31 and 32 as shown in FIG. 1.

The present embodiment, which achieves simple structure for the holes 13a and 14a drilled into the housing H as well as the columns 23a and 24a integrally formed with the frame F, can make a reduction in production cost.

The minimum fasteners required for fixing the housing H and frame F allows a reduction in the number of parts and man-hours associated with assembly.

Since the size and shape of housing H and frame F of the present embodiment represents an example, they may be modified according to a vehicle to which a door mirror assembly is mounted. The construction of each engagement port of housing H and each engagement element of frame F is not limited to that described in the embodiment. For example, a claw is formed on the housing H and a hole is drilled into the frame F. Furthermore, though the number of engagement sections in the present embodiment is set to be two, it can be reduced to one or increased as required.

What is claimed is:

1. A door mirror assembly for a vehicle comprising:
   a housing having a shell with a front aperture, two fixation ports being formed on an inner surface of the shell and an engagement port being integrally formed with the shell;
   a frame having a main body provided in the shell, two fixation elements being formed on an outer surface of the main body and an engagement element being integrally formed with the main body, the frame being fixed to a mirror base and supporting the housing, the mirror base fixed to the vehicle;
   two fixation sections formed by rigidly fixing the two fixation ports to the two fixation elements with fasteners, respectively; and
   an engagement section formed by elastically engaging the engagement port with the engagement element,
   wherein the engagement section is positioned offset from an axis defined by the two fixation sections, so that a rotational displacement of the housing relative to the frame can be restricted.

2. A door mirror assembly according to claim 1, wherein at least two engagement sections are provided and the engagement sections restrict the rotational displacement of the housing in opposite directions to each other.

3. A door mirror assembly according to claim 1, wherein the engagement port comprises a hole drilled into the shell, and the engagement element comprises a column projecting from the main body and the column has a claw at an end thereof, and wherein not only the column is adapted to reach beyond an outer surface of the shell through the hole while the column is in contact with a side wall of the hole, but also the claw is adapted to be in contact with periphery of the hole.

4. A door mirror assembly according to claim 3, wherein the column has a contact surface to be in contact with the inner surface of the shell.

5. A door mirror assembly according to claim 3, wherein the claw is positioned so that a direction of a width of the claw is substantially in parallel with the axis.

* * * * *